July 29, 1930.  O. P. COX  1,771,774
STATION ANNOUNCER
Filed Oct. 10, 1925
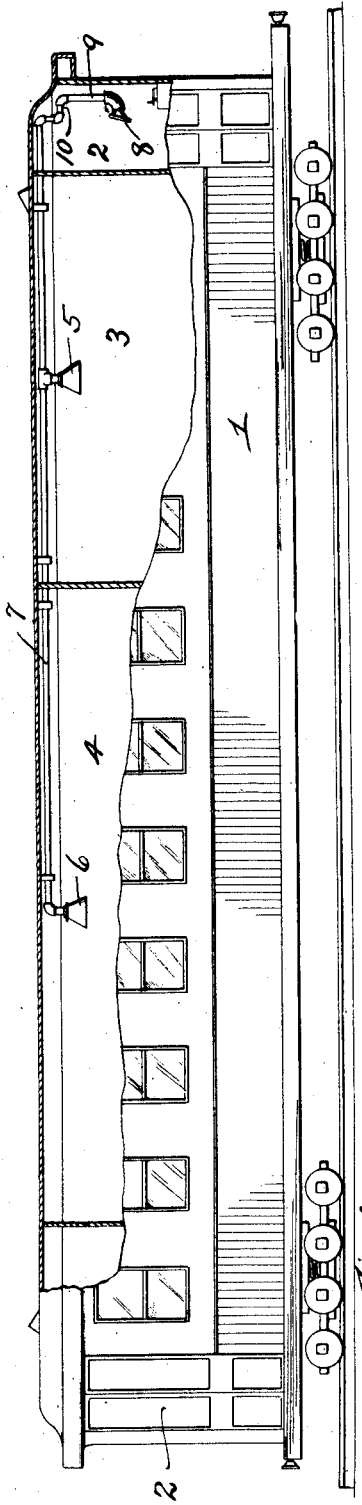
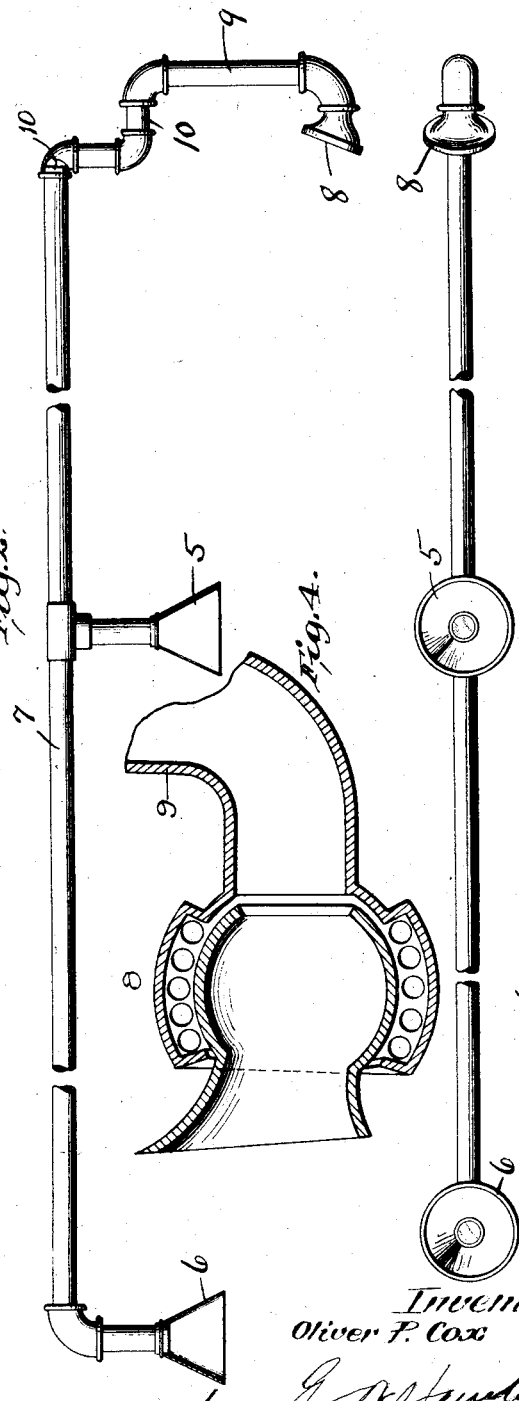
Inventor
Oliver P. Cox
by
Attorney.

Patented July 29, 1930

1,771,774

UNITED STATES PATENT OFFICE

OLIVER PERRY COX, OF NEWBURG, INDIANA

STATION ANNOUNCER

Application filed October 10, 1925. Serial No. 61,793.

This invention relates to a station announcer for public vehicles.

The object of my invention is to provide an improved announcer of the speaking tube and megaphone type adapted for use on urban or interurban cars, railroad cars, buses, boats, and other public vehicles by which the motorman, driver, or other official or operative may announce stations or stops simultaneously to different parts of the vehicle as, for instance, to the different compartments, such as smokers' and passengers' of an interurban car.

The invention is useful for all classes of passengers on all kinds of public vehicles but is particularly helpful to passengers who are deaf because the slightest whisper of the announcer is greatly amplified by the megaphone distributors through which the voice issues to communicate the desired information to the passengers.

While the invention is illustrated only in connection with a passenger car such as is commonly used in interurban service, it is to be understood that it is adapted for use on all kinds of public vehicles, as previously set forth, and that any number of megaphones or megaphone outlets may be provided at any desired points of the system and, similarly, there may be provided more than one announcer's mouthpiece.

In the accompanying drawing,—

Figure 1 is a side elevation, broken away, showing the invention applied to an interurban passenger car;

Fig. 2 is a detail view of the announcer by itself;

Fig. 3 is a bottom view thereof.

Fig. 4 is a detail sectional view of the mouthpiece.

An ordinary interurban passenger car is shown at 1, the motorman's compartment appearing at 2; the smoker's compartment is shown at 3; and the passenger's compartment appears at 4.

In the compartments 3 and 4 there are megaphones or amplifiers 5, 6 of any desired construction which are preferably located at the ceiling or top of the car, said megaphones being connected to a line of pipe or tubing 7 which extends into the motorman's compartment 2.

The announcing mouth-piece into which the motorman speaks, appears at 8. The mouth-piece 8 is carried by a downward extension 9 of the pipe or tube 7. Preferably, the mouth-piece 8 will be swiveled in a ball and socket-like fashion, as shown in Fig. 4, so that the motorman may adjust it as desired to facilitate speaking his announcements of stations thereinto.

Preferably, the extension 9 will be provided with a swinging joint 10, as shown in section in Fig. 2, where the part 10 is journaled in the upper end of extension 9, as at 10', so that the lower part of the extension may be bodily swung from side to side to position it as desired and to enable the motorman to swing it out of the way when it is not needed for use.

The same system will be used on any vehicle equipped with the invention. Other mouth-pieces may be provided at different points and as many of the megaphones may be used as desired. While I have shown an announcing arrangement in only one of the motorman's compartments, it is obvious that a similar arrangement may be provided in the motorman's compartment at the other end of the car.

What I claim is:

A station announcer for public vehicles comprising a plurality of megaphones located at different points of the vehicle, a single pipe connected to all of said megaphones, and an announcer's appliance connected to said single pipe, comprising an extension pipe having a swinging jointed connection to the single pipe aforesaid and arranged so that it may be swung as a unit upwardly or downwardly and in a lateral direction in relation to the vehicle, and a mouth-piece having a ball and socket connecting it to said swinging extension pipe, whereby the extension pipe may be swung laterally to any position desired, and the mouthpiece adjusted to any angle, to meet the requirements of the announcer.

In testimony whereof I affix my signature.

OLIVER PERRY COX.